Patented Oct. 5, 1954

2,691,036

UNITED STATES PATENT OFFICE 2,691,036

ALLYLIC REPLACEMENT OF UNSATURATED PERHALOCARBON COMPOUNDS

William T. Miller, Ithaca, N. Y.

No Drawing. Application November 30, 1950,
Serial No. 198,498

14 Claims. (Cl. 260—465.7)

This invention relates to perhalocarbon compounds and the method of preparing them. In one aspect, the invention relates to the production of functional derivatives of unsaturated perhalocarbons. In another more particular aspect, the invention relates to the production of perhalovinyl compounds by intermolecular replacements of allylic halogens. This invention is a continuation-in-part of my prior and co-pending application Serial No. 601,387, filed June 25, 1945, now abandoned.

It has been found that perhalocarbon compounds and their derivatives are of value in various industrial applications such as protective coating compositions, electrical insulation, dielectrics, lubrication, refrigeration and the like. Typical of these perhalocarbons are the perfluorocarbons and chloro-derivatives of perfluorocarbon compounds, which may be prepared by the dimerization and addition reactions of fluorine with mono- and di-olefins, by methods such as thermal reactions of perhalo-olefins or by other methods. The principal type products obtained from reaction between fluorine and perhalo ethylenes are the simple or normal addition product and the dimer addition product. The dimerization reaction is important in that it leads to the formation of higher molecular weight compounds from low molecular weight olefins. An example of such reaction, is the fluorination of difluorodichloroethylene at a temperature between about −70° C. and about −75° C. to give a 40% yield of the dimer addition product ($C_4Cl_4F_6$ or $CF_2ClCFClCFClCF_2Cl$) 1,2,3,4-tetrachloroperfluorobutane. By-products from this fluorination reaction of $CFCl=CFCl$ are mainly butanes containing up to 6 chlorine atoms and ethanes containing from 1 to 4 chlorine atoms. Nearly quantitative conversion of the dimer $C_4Cl_4F_6$ into perfluorobutadiene-1,3 has been accomplished by dechlorination with zinc dust under improved conditions for isolation and recovery of this product. Perfluorobutadiene and the perfluorochlorobutadienes prepared in this way may be converted into a variety of perfluoro products by fluorination and polymerization procedures. Dechlorination of the dimer addition product of $CFCl=CFCl$ ($CF_2ClCFClCFClCF_2Cl$)

with zinc dust and dioxane solution may be carried out so as to give substantial yields of 1,4-dichloroperfluorobutene-2

($CF_2ClCF=CFCF_2Cl$)

along with perfluorobutadiene-1,3.

Using a Pyrex reactor tube 1″ in diameter heated over a 1′ section to a maximum temperature of 550–560° C., trifluorochloroethylene passing through this reactor at the rate of 30–40 grams per hour reacts to give the following approximate amounts of principal products:

| | | |
|---|---|---|
| $CFCl_2-CF=CF_2$ | 15–25% } | 30% |
| $CF_2Cl-CF=CF_2$ | 5–10% } | |
| $CF_2Cl-CFCl-CF=CF_2$ | 35% } | 65% |
| $CF_2-CFCl-CFCl-CF_2$ | 30% } | |
| High boiling residues | | 5% |

In other experiments the ratio of propenes obtained was approximately one to one.

For example, $CF_2=CFCl$ passed at a 45 g./hr. rate through each of six 3 x 30 cm. Pyrex glass reactor tubes of a small scale pilot plant reacted when heated to 550–560° C. for 15 seconds to give the following approximate yields of major products.

| | | |
|---|---|---|
| $CF_2=CF-CF_2Cl$ | 10% } | 20% |
| $CF_2=CF-CFCl_2$ | 10% } | |
| $CF_2-CFCl-CFCl-CF_2$ | | 34% |
| $CF_2=CF-CFCl-CF_2Cl$ | | 30% |
| Higher B. P. residue | | 5% |
| Lower B. P. by products | | 11% |

These average results were obtained from a total pass of about 20 kilograms of $CF_2=CFCl$ in three units with an average conversion of about 70%. At higher temperatures, the proportion of propenes in the reaction product is increased.

It will be noted that among the olefinic compounds prepared by the above methods, are those which contain allylic halogen, that is, a halogen atom which is bonded to a carbon atom adjacent to a doubly bonded carbon atom, as exemplified by the compound $CF_2=CFCF_2Cl$ in which the chlorine atom is referred to as the allylic chlorine, and is more reactive than the fluorine atoms attached to the same carbon atom. In perfluoro unsaturated compounds, allylic fluorine atoms are also more reactive than the fluorine atoms in the corresponding saturated compound.

It is, therefore, an object of the present invention to produce functional derivatives of unsaturated perhalo compounds.

Another object of the invention is to produce functional derivatives of unsaturated perhalo compounds by a method of intermolecular replacement.

A further object of the invention is to produce perhalovinyl compounds by intermolecular replacements of allylic halogens.

Other objects and advantages of the invention will become apparent from the following more detailed disclosure.

It has now been found that allylic halogen in perfluoro compounds containing fluorine may be preferentially replaced to produce functional derivatives of unsaturated perhalo compounds, which contain elements other than carbon and halogen, by reaction with reagents such as ammonia and amines, as more fully hereinafter described.

The functional derivatives of unsaturated perhalocarbons produced by the method of this invention are particularly useful as synthetic intermediates for the production of other perhalocarbon derivatives of relatively low molecular weight and as monomers for polymerization to form materials of relatively high molecular weight which are useful as lubricants, coating compositions and the like.

It has thus been found that perhaloallyl compounds may be reacted with ammonia and amino derivatives to produce a variety of useful halocarbon derivatives, such as perhalo acrylonitriles. These reactions involve the progressive replacement of allylic halogens with nitrogen or a nitrogen-containing grouping, by splitting out the hydrogen halide between the hydrogens on the ammonia or amine molecule and the allylic halogens of the allyl perhalocarbon with the formation of corresponding nitrogen bonds. Three hydrogens are available for reaction in the case of ammonia, and the resulting product is a nitrile. For example, perfluoro acrylonitrile may be prepared from perfluoro allyl chloride and ammonia. This reaction is indicated, in part, by the following equation:

$$CF_2=CFCF_2Cl+NH_3 \rightarrow CF_2=CFCN$$

Another type of reaction for the preparation of perhalo acrylonitriles in accordance with the present invention, is indicated in part by the following equation:

$$CF_2=CClCF_2Cl+NH_3 \rightarrow CF_2=CClCN$$

The preparation of acrylonitriles according to the above equations constitutes a preferred application of the present invention.

In the case of a primary amine, two hydrogens are available for reaction, and a halogenated compound with a C=N linkage analogous to a Schiff base or azomethine is produced. This reaction is indicated, in part, by the following equation:

$$CF_2=CFCF_2Cl+RNH_2 \rightarrow CF_2=CFCF=NR$$

Only one reactive hydrogen is available in a secondary amine and the reaction leads to a tertiary amine with one halogenated grouping. This reaction is indicated, in part, by the following equation:

$$CF_2=CFCF_2Cl+R_2NH \rightarrow CF_2=CFCF_2NR_2$$

The reactions between allylic perhalo compounds and ammonia or amines to yield the products of the present invention, may be represented as follows:

(1) $CF_2=CXCF_2Y+4NH_3 \rightarrow$
$\qquad CF_2=CXCN+2NH_4F+NH_4Y$ (2) $CF_2=CXCF_2Y+3RNH_2 \rightarrow$
$\qquad CF_2=CXCF=NR+RNH_3F+RNH_3Y$ (3) $CF_2=CXCF_2Y+2R_2NH \rightarrow$
$\qquad CF_2=CXCF_2NR_2+R_2NH_2Y$ where: X is chlorine or fluorine; Y is fluorine, chlorine, bromine or iodine; R is an alkyl grouping such as $CH_3$, $CH_3CH_2$ or $(CH_3)_2CH$ and the like; or an aryl grouping such as a phenyl or naphthyl grouping. However, alkyl groupings are preferred. The alkyl (R) groupings may be the same or different in reaction (3) above. Compounds formed by the progressive replacement of allylic halogen with the formation of corresponding carbon-nitrogen bonds, as illustrated by the above equations, are termed "perhalovinyl compounds" and are to be understood as being derived from unsaturated allylic perhalocarbons by the method of this invention.

As examples of the ammonia or amino derivatives that may be employed in carrying out the above reactions are pure ammonia; alkyl amines such as methylamine, ethylamine, dimethylamine; and aryl amines such as aniline, toluidine, and n-methylaniline. In carrying out the replacement reaction between the unsaturated perhalocarbon and the ammonia or amine reagent, in accordance with the equations indicated above, the reagents are preferably employed in a suitable solvent. The solvent is preferably in a non-aqueous condition. Thus, the reagent may be present in such solvents as acetone, benzene or an ether. Other suitable solvents may be chosen from the group comprising pyridine and other tertiary amines, dioxane, dibutyl ether and other ethers. In any given case the solvent is chosen to facilitate subsequent separation of the desired reaction products. Therefore, the solvent chosen is preferably one which is readily separable by distillation from the reactants and reaction products.

The reaction between the unsaturated perhalocarbon, containing the allylic halogen, and the ammonia or amino reagent is carried out in a suitable mixing vessel with sufficient stirring to insure thorough mixing, so that the halogens to be replaced by reaction with the ammonia or amine will, in general, be obtained as an ammonium type salt precipitate as indicated by the reactions shown above. An appreciable excess of free ammonia or amine is preferably avoided by the addition of the reagent to the halide at a rate comparable to or less than the rate of reaction. The reaction is carried out at atmospheric pressure and at a temperature between about −10° C. and about 150° C., with a temperature between about 0° C. and about 150° C. being preferred. Following complete admixture and reaction between the unsaturated perhalocarbon starting material and the reagent, there is obtained a mixture comprising the desired product, namely, the perhalovinyl compound, as defined above, in the solvent and ammonium salts corresponding to the halogen replaced, in suspension or partially dissolved depending upon the solvent employed. This mixture is next subjected to distillation in order to separate the desired product and other components present. If desired, the ammonium salts may be separated by filtration before distillation to minimize super-heating and bumping in the distillation vessel. Where higher boiling products are obtained as a result of the aforementioned reactions, isolation may be accomplished by filtering off or by washing out with water the ammonium halide salts formed in the reaction, and subsequently drying and vacuum-distilling the desired products.

The following examples will serve to illustrate some of the types of the perhalovinyl compounds obtainable and the method of preparing them according to the present invention.

*Example I*

One-half mol, 83.2 grams of 3-chloroperfluoropropene ($CF_2=CFCF_2Cl$), was dissolved in approximately 500 cc. of anhydrous dioxane contained in a 1-liter three-necked flask. The flask was fitted with a gas addition tube to extend just above the liquid level and provided with a mechanical device which made it possible to clear the tube if solids accumulated at the opening, a Herschberg-type mechanical stirrer with a gastight shaft seal and an ice-water cooled reflux condenser surmounted by a Dry-Ice cooled reflux condenser. The stirrer was started and the mixture was maintained at gentle reflux. Dry ammonia gas contained in a small steel cylinder was fed into the reaction flask at such a rate that appreciable condensate did not form on the Dry-Ice cooled condenser. The rate of ammonia flow was controlled by a needle-valve and a flowmeter filled with a light petroleum oil. The overall consumption was checked periodically by weighing the cylinder, which was mounted on a balance and connected to the reaction system with a flexible tube. Ammonium halide salts precipitated as the reaction proceeded. A total of 34 grams of ammonia (2 mols) was passed into the reaction mixture. The ammonia was added at such a rate that it was used up approximately as fast as added and momentary excess of ammonia avoided as far as possible. After addition of the ammonia, the mixture was stirred for an additional hour and then distilled directly, using oil bath heating, with the stirrer operating after replacing the reflux condenser with a short-packed column and distillation head. A fraction, having a B. P. of 6.5° C. to 35° C., was collected which consisted essentially of a small quantity of recovered starting material, 3-chloroperfluoropropene, and the desired end-product, perfluoroacrylonitrile, $CF_2=CFCN$. The perfluoroacrylonitrile was obtained in the pure form by fractional distillation through an efficient column.

*Example II*

In accordance with the procedure described in Example I above, chloroperfluoroacrylonitrile, $CF_2=CClCN$, having a B. P. of 62° C. to 65° C., was prepared from $CF_2=CClCF_2Cl$ (2,3-dichloroperfluoropropene-1).

*Example III*

In another preparation of perfluoroacrylonitrile, $CF_2=CFCN$, similarly carried out according to the procedure indicated in Example I above, anhydrous pyridine was employed as the solvent and only one mol of ammonia was added to the reaction mixture. It was found that the greater solubility of the pyridonium salts formed in the reaction, facilitated stirring and the maintenance of good heat control. It is thus shown that when a tertiary amine such as pyridine is utilized as a solvent, only one mol of the reactive ammonia or primary or secondary amine is required, inasmuch as the tertiary amine combines with the hydrogen halide formed in the reaction. This reaction is indicated as follows, in which proper substitutions for X and Y may be made in accordance with the equivalents previously indicated.

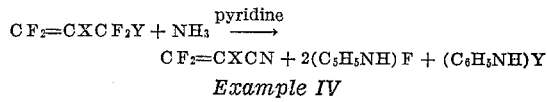

$$CF_2=CXCF_2Y + NH_3 \xrightarrow{\text{pyridine}}$$
$$CF_2=CXCN + 2(C_5H_5NH)F + (C_5H_5NH)Y$$

*Example IV*

$CF_2=CClCF_2Cl$ (2,3-dichloroperfluoropropene-1) prepared by the pyrolysis of $CF_2=CFCl$ (fraction B. P. 35–45° C.) was slowly added to diethyl amine with stirring. A rapid exothermic reaction occurred and a yellow crystalline solid was formed. The solid on treatment with neutral, acidic, or basic aqueous solutions gave an oil which was insoluble in concentrated HCl and heavier than water. When it was distilled a fraction boiling at 204–206° C. at atmospheric pressure was obtained. The distillate was colorless and had a sharp narcotic odor.

I claim:
1. A process for the allylic replacement of an unsaturated perhalocarbon which comprises: reacting, with ammonia, an unsaturated perhalocarbon having a first unsaturated carbon atom containing only fluorine halogen substitution once removed from an allylic carbon atom containing a fluorine substituent, and a second unsaturated carbon atom containing halogen substitution selected from the group consisting of fluorine and chlorine between said first unsaturated carbon atom and said allylic carbon atom, whereby allylic halogen is replaced with the formation of corresponding carbon-nitrogen bonds to produce a reaction mass comprising the corresponding perhalovinyl compound derived from said unsaturated perhalocarbon.

2. A process for the allylic replacement of an unsaturated perhalocarbon which comprises: reacting, with ammonia in a non-aqueous solvent, an unsaturated perhalocarbon having a first unsaturated carbon atom containing only fluorine halogen substitution once removed from an allylic carbon atom containing a fluorine substituent, and a second unsaturated carbon atom containing halogen substitution selected from the group consisting of fluorine and chlorine between said first unsaturated carbon atom and said allylic carbon atom, whereby allylic halogen is replaced with the formation of corresponding carbon-nitrogen bonds to produce a reaction mass comprising the corresponding perhalovinyl compound derived from said unsaturated perhalocarbon.

3. A process for the allylic replacement of an unsaturated perhalocarbon which comprises: reacting, with ammonia an unsaturated perhalocarbon having a first unsaturated carbon atom, containing only fluorine halogen substitution once removed from an allylic carbon atom containing a fluorine substituent, and a second unsaturated carbon atom containing halogen substitution selected from the group consisting of fluorine and chlorine between said first unsaturated carbon atom and said allylic carbon atom, at a temperature between about −10° C. and about 150° C., whereby allylic halogen is replaced with the formation of corresponding carbon-nitrogen bonds to produce a reaction mass comprising the corresponding perhalovinyl compound derived from said unsaturated perhalocarbon.

4. A process for the allylic replacement of an unsaturated perhalocarbon which comprises: reacting, with ammonia, an unsaturated perhalocarbon having a first unsaturated carbon atom containing only fluorine halogen substitution once removed from an allylic carbon atom containing a fluorine substituent, and a second unsaturated carbon atom containing halogen substitution selected from the group consisting of fluorine and chlorine between said first unsaturated carbon atom and said allylic carbon atom, at a temperature between about 0° C. and about 100° C., whereby allylic halogen is replaced with the formation of corresponding carbon-nitrogen bonds to produce a reaction mass comprising the corresponding perhalovinyl compound derived from said unsaturated perhalocarbon.

5. A process for the allylic replacement of an unsaturated perhalocarbon which comprises: reacting, with ammonia in a non-aqueous solvent, an unsaturated perhalocarbon having a first unsaturated carbon atom containing only fluorine halogen substitution once removed from an allylic carbon atom containing a fluorine substituent, and a second unsaturated carbon atom containing halogen substitution selected from the group consisting of fluorine and chlorine between said first unsaturated carbon atom and said allylic carbon atom, whereby allylic halogen is replaced with the formation of corresponding carbon-nitrogen bonds to produce a reaction mass comprising the corresponding perhalovinyl compound derived from said unsaturated perhalocarbon, solvent and reagent; separating reagent from said reaction mass; and separating said perhalovinyl compound from the remainder of said reaction mass.

6. A process for the allylic replacement of an unsaturated perhalocarbon which comprises: reacting, with ammonia in a non-aqueous solvent, an unsaturated perhalocarbon having a first unsaturated carbon atom containing only fluorine halogen substitution once removed from an allylic carbon atom containing a fluorine substituent, and a second unsaturated carbon atom containing halogen substitution selected from the group consisting of fluorine and chlorine between said first unsaturated carbon atom and said allylic carbon atom, at a temperature between about 0° C. and about 100° C., whereby allylic halogen is replaced with the formation of corresponding carbon-nitrogen bonds to produce a reaction mass comprising the corresponding perhalovinyl compound derived from said unsaturated perhalocarbon, solvent and reagent; separating reagent from said reaction mass; and separating said perhalovinyl compound from the remainder of said reaction mass.

7. A process of claim 2 wherein the solvent is acetone.

8. The process of claim 2 wherein the solvent is benzene.

9. The process of claim 2 wherein the solvent is an ether.

10. The process of claim 2 wherein the solvent is pyridine.

11. The process of claim 2 wherein the solvent is dioxane.

12. A process for the allylic replacement of $CF_2=CFCF_2Cl$ which comprises reacting the aforesaid perhalocarbon with ammonia in an non-aqueous solvent whereby $CF_2=CFCN$ is produced.

13. A process for the allylic replacement of $CF_2=CClCF_2Cl$ which comprises reacting the aforesaid perhalocarbon with ammonia in an non-aqueous solvent whereby $CF_2=CClCN$ is produced.

14. A process for the allylic replacement of an unsaturated perhalocarbon which comprises: reacting an unsaturated perhalocarbon having the general composition $CF_2=CXCF_2Y$ with ammonia wherein a perhalo acrylonitrile is produced having the general composition $$CF_2=CXCN$$

and wherein X is a member of the group consisting of chlorine and fluorine, and Y is a halogen.

References Cited in the file of this patent

UNITED STATES PATENTS

| Number | Name | Date |
| --- | --- | --- |
| 2,409,315 | Rigby et al. | Oct. 15, 1946 |
| 2,437,289 | Barrick | Mar. 9, 1948 |
| 2,439,505 | Chaney | Apr. 13, 1948 |